United States Patent [19]
Nordstrom et al.

[11] 3,734,216
[45] May 22, 1973

[54] WEIGHING DEVICE

[75] Inventors: Kjell Helge Nordstrom; Rune Nils Allan Flinth, both of Vasteras, Sweden

[73] Assignee: Conrail AB, Vasteras, Sweden

[22] Filed: Sept. 16, 1971

[21] Appl. No.: 181,031

[30] Foreign Application Priority Data

Sept. 21, 1970 Sweden ..............................1803/70

[52] U.S. Cl. ...................177/136, 177/163, 177/211
[51] Int. Cl. .......G01g 19/08, G01g 21/22, G01g 3/14
[58] Field of Search..........177/134–136, 163, 211; 73/141 A

[56] References Cited
UNITED STATES PATENTS

| | | |
|---|---|---|
| 3,366,189 | 1/1968 | Bellier ..............................177/211 X |
| 3,554,025 | 1/1971 | Andersson et al................177/211 X |
| 3,085,642 | 4/1963 | Raskin................................177/134 |
| 3,213,953 | 10/1965 | Flinth ..............................177/211 X |
| 3,347,326 | 10/1967 | Raskin................................177/163 |

Primary Examiner—George H. Miller, Jr.
Attorney—Yount & Taroll

[57] ABSTRACT

A weigh device for static or dynamic weighing of railway guided vehicles comprising a weigh rail fixedly supported at both ends and strain gages positioned on the rail a predetermined distance apart and arranged such that the gages are essentially insensitive to bending moments and sense the strain in the rail in proportion to the shear forces imposed on the rail when a load is applied to the weigh rail.

19 Claims, 15 Drawing Figures

WEIGHING DEVICE

This invention relates to weighing devices and, more particularly, to a weigh device for the static or dynamic weighing of railway guided vehicles.

It is well known that weighing of railway guided vehicles can be accomplished by means of stationary platform scales which are arranged in weighing pits in the path of the vehicle. One example of such a scale is disclosed in a pamphlet published by Toledo Scale Corporation, Toledo, Ohio, and entitled "Toledo Steel Master Levers." Typical of such arrangements is the provision on the upper surface of the platform of a rail of some kind as, for example, a channel beam for a vehicle having rubber wheels or a rail in the case of railway cars. In either instance, the wheel engaging surface of the rail carried by the platform is in the same plane as the corresponding surface on the fixed ground supported rails adjacent to the scale, but the platform rails are separated from the ground supported rails by an open joint at either end so that the rail section carried by the platform scale is free to move vertically. In such arrangements, the load resting on the scale may be sensed by various means such as, for example, a mechanical weighing system or by the use of load cells.

Typical examples of prior art systems for weighing railway cars may be found in British Pats. 820,969, 797,161 and 832,389; German Pat. DBP/1,079,338; French Pats. 1,292,587 and 974,974; and Swedish Pat. 217,810. Systems such as those disclosed in the aforementioned patents have, in practice, been found to have several drawbacks. For example, the usual requirement of a stiff solid support for the scale has resulted in the use of massive expensive scale foundations. In addition to the expense of such installations, they are unsuitable for use in a rail system in which railway cars must be allowed to pass the scale at full speed when the cars are not to be weighed since substantial wear occurs at the joint between the weigh platform and the adjoining rails and damaging stresses are imposed on the weighing system by the rapidly moving cars.

In an attempt to avoid the use of large expensive scale foundations, it has been proposed to utilize strain gages attached directly to the rails with the strain gages measuring the strain caused by the bending stresses imposed on the rail with the strain measurement being used to determine the weight of the vehicle. Weighing systems of this type are disclosed in U.S. Pat. Nos. 3,085,642, 3,155,184 and 3,347,326. The principle advantage of arrangements such as those disclosed in the aforementioned patents is that it is possible to have an uninterrupted rail at the weighing area. However, systems such as those disclosed in the aforementioned patents do have substantial drawbacks. For example, these systems require that the wheel of the vehicle be precisely in the middle of the weighing section in order to obtain an accurate reading of the weight of the vehicle. It is, of course, theoretically possible to overcome this problem by attaching the strain gages at spaced locations on the rail, both on the top and bottom surface of the rail. However, it is apparent that those strain gages arranged on the upper surface of the rail which compensate for unwanted bending moments can, as a practical matter, not be located in that position due to interference with the wheels of the vehicle.

Another disadvantage of these systems is the practical impossibility of weighing an entire car either statically or dynamically. With devices which accurately measure only at a single point, variations in axle spacings, car spacings and the like prevent obtaining an accurate weight reading.

A particularly troublesome problem with systems such as that disclosed in U.S. Pat. No. 3,085,642 arises where the vehicles are to be weighed in motion. Since the train normally oscillates in the vertical plane due to many factors including the flexing of the rails between the ties, the existence of open rail joints, and variations both in the surface of the rail and the wheels of the vehicle, it will be appreciated that any weight measurement taken at a single point while the train is moving will, only by chance, represent the true vehicle weight.

It is a primary object of this invention to overcome the aforementioned problems, as well as others, and provide a weigh system in which a weigh rail replaces a portion of the normal rail system with the weigh rail utilizing strain gages which measure the strain caused by shear and which system is essentially insensitive to bending moments and the position of the wheel in the weigh device.

In accordance with a principle aspect of this invention, a weigh rail is supported at both ends with strain gages positioned at a predetermined spacing along the neutral axis of the section and at the inflection points of the section whereby the strain gages measure the shear stresses imposed on the rail and are insensitive to the influence of bending moments.

In accordance with a further aspect of the invention, the weigh rail may be used with a relatively stiff reinforcing framework which further isolates the weigh section of the rail from external bending forces and enhances the measuring accuracy of the system.

In accordance with still another aspect of the invention, the weigh rail may be provided with a reinforced rigid midportion which defines a weigh section between the strain gages and along which the load may be applied at various locations without any significant effect on the measuring accuracy of the system.

Other features, objects and aspects of the invention will be more apparent upon a complete reading of the following description which, together with the attached drawings, discloses but certain preferred forms of the invention.

Referring no to the drawings wherein like reference numerals indicate like parts in the various views.

Figure 1A:
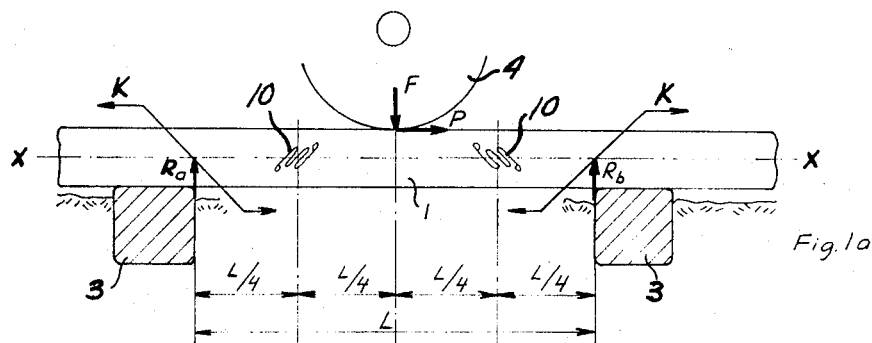
FIG. 1(a) is a schematic side elevation view of a weigh system constructed according to the principles of this invention.

Referring now more in detail to the drawings, FIG. 1(a) shows a weigh device which illustrates the principles of the invention in its basic form. In that Figure, a rail 1 comprising the weigh rail is supported on spaced apart ties 3. A vehicle wheel 4 is illustrated as being positioned at the midpoint of the rail span between the two ties 3 with the wheel 4 applying a load F which produces reaction forces $R_a$, $R_b$ at the ties 3. Strain gages 10 are secured to the rail at positions hereinafter described.

Figure 1B:
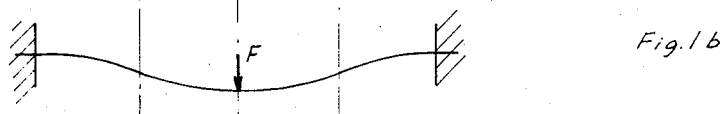
FIG. 1(b) is a graphic presentation of the elastic deformation of the rail section of FIG. 1(a) as a load is applied.
Figure 1C:
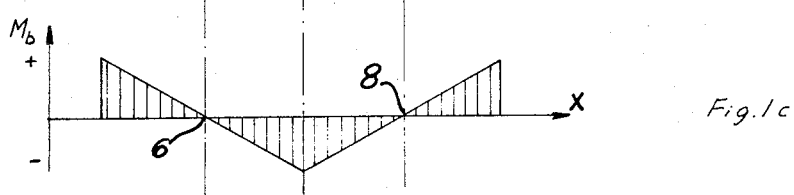
FIG. 1(c) is a graphic presentation of the moment diagram for the rail section of FIG. 1(a).
Figure 1D:
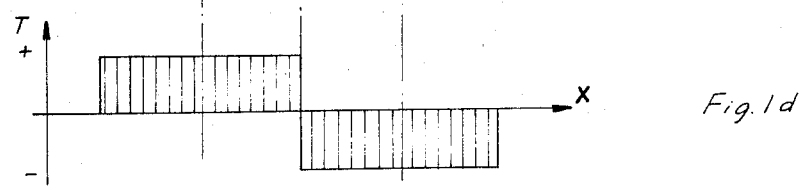
FIG. 1(d) is a graphic presentation of the shear force diagram for the rail section of FIG. 1(a).

FIG. 1(b) illustrates the line or curve formed by the neutral axis of the rail span between the two ties 3 as the rail deflects under the influence of the load F. FIG. 1(c) graphically illustrates the distribution of the bending moments along the rail and it will be observed that the bending moments are zero at the two inflection points 6, 8, each of which is positioned midway between a tie 3 and the point where the load F is applied. FIG. 1(d) graphically illustrates the shear force distribution along the rail with the shear force shifting sign where load F is applied and being constant in magnitude at all other locations.

From the foregoing graphic presentation of the forces acting on the weigh rail, it will be observed that by utilizing strain gages arranged to sense the shear forces acting in the rail, the strain gages could, in principle, be positioned anywhere between the load application point and the reaction points $R_a$, $R_b$ and still experience a total resistance change proportional to the force F. Moreover, if the strain gages are centered on the inflection points 6, 8 along the longitudinal neutral axis X—X of the rail, the measuring accuracy is, in principle, not affected by the end moments K or other moments acting in the same plane as moments K, such as, for instance, moments caused by the frictional forces P created by friction in the axle journals of the wheels.

Accordingly, FIG. 1(a) illustrates the strain gages 10 as being positioned at the inflection points 6, 8 and with each gage oriented essentially at 45 degrees to the neutral axis X—X so that the strain gages are operative to sense shear strains due to shear forces in the rails and thereby produce readings which are proportional to the applied force F. With the gages centered on the neutral axis, any strains in the portion of the gages above the axis caused by bending moments is offset or compensated by strains of opposite polarity and equal magnitude in the portion of the gages below the neutral axis.

With the described arrangement, the weigh device is capable of weighing with a high degree of accuracy and is insensitive to external bending moments so long as the strain gages are centered on the neutral axis and positioned at the inflection points 6, 8 of the rail.

However, in practice it is difficult to locate the gages at the inflection points since the position of these inflection points varies as the end moments acting on the weigh rail vary. Various factors external to the weigh rail will influence these end moments. For example, these end moments may be affected by the wheels ahead of and behind the weigh rail, variations in the track base, as well as a multiplicity of other factors. Accordingly, to obtain a practical weighing system, it is desirable that the influence of these variable bending moments be limited to a minimum so that the inflection points for a given weigh rail remain essentially constant thereby permitting a determination of where these inflection points are located and the amounting of the strain gages at those inflection points.

Figure 2A:
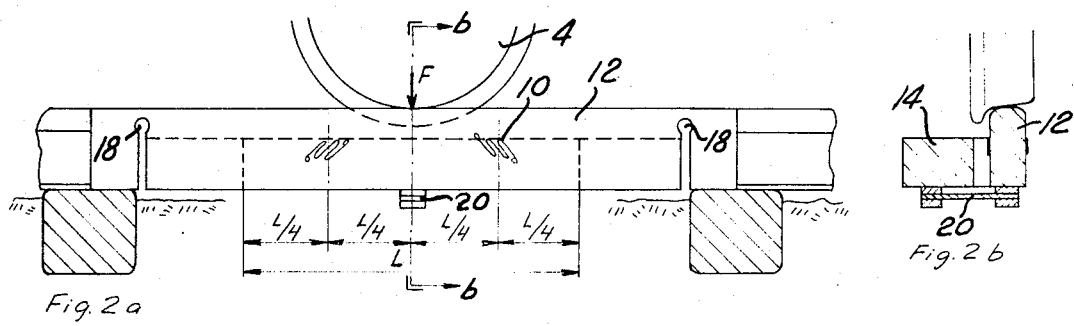
FIG. 2(a) is a side elevation view of a modified form of the weigh rail.
Figure 2B:
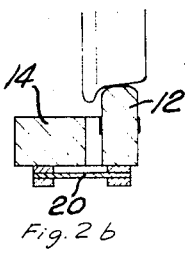
FIG. 2(b) is a cross-sectional view along the line B—B of FIG. 2(a).
Figure 2C:
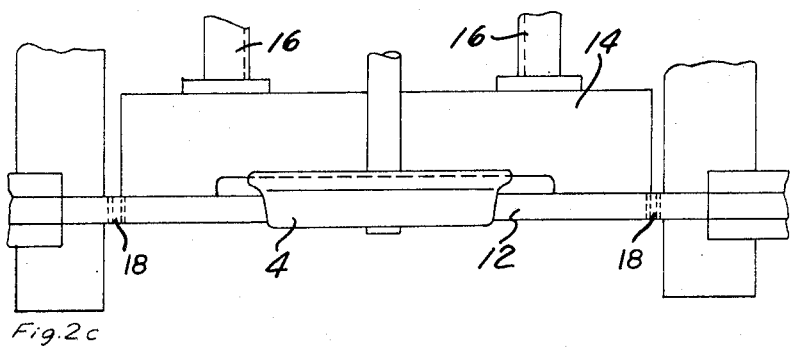
FIG. 2(c) is a plan view of the weigh rail of FIG. 2(a).

Various constructions may be employed to maintain the end moments constant so that the inflection points can be determined with accuracy. For example, illustrated in FIGS. 2(a)-(c) is a weigh device in which the weigh rail 12 is provided with a reinforcing member 14 which is connected to the rail 12 at spaced points. Cross members 16 interconnect the reinforcing members 14 on both rails. The rail 12 is also slotted as shown at 18 at points outside the connection between the rail 12 and the reinforcing members 14. The slots 18 produce a deflectable weakened section which serves to isolate the weigh rail from the rest of the rail system while providing a smooth transition for the wheels on the weigh section.

To protect the weigh rail from introduction of torsion moments, the weigh section 12 may be connected to the reinforcing member 14 by membranes or tiebars 20 which are stiff in a horizontal direction but soft in the vertical direction. The tiebars 20 should be positioned as far from the torsion axis/neutral axis as possible in order to provide the best possible results and, preferably, the tiebar should be arranged both over and under the neutral axis.

With the arrangement shown in FIGS. 2(a)-(c), the influence of variable external bending moments is substantially eliminated. Thus, the deflectable weakened sections created by the slots 18 effectively isolates the weigh rail 12 from external bending moments while the reinforcing member 14 cooperates with the weigh rail to provide two relatively rigid or stiff support sections with a weigh section defined therebetween. From the graphic presentation of FIG. 1(c), it is known that, with the load centered on the rail and with the influence of external bending moments effectively eliminated, each inflection point 6, 8 will be located at one-half the distance between the point at which the load is applied and the rigid or stiff section provided by reinforcing member 14. Accordingly, this distance can be readily determined and the strain gages can be positioned with accuracy.

The foregoing arrangement, while generally satisfactory, has the limitation that the wheel 4 must be positioned at the midpoint of the weigh section. If the wheel is positioned at some other point, this will affect the location of the inflection points 6 and 8. Accordingly, weighing with maximum accuracy can be obtained with the embodiment of FIGS. 2(a)-(c) only when the wheel is precisely positioned at the midpoint.

Figure 3:
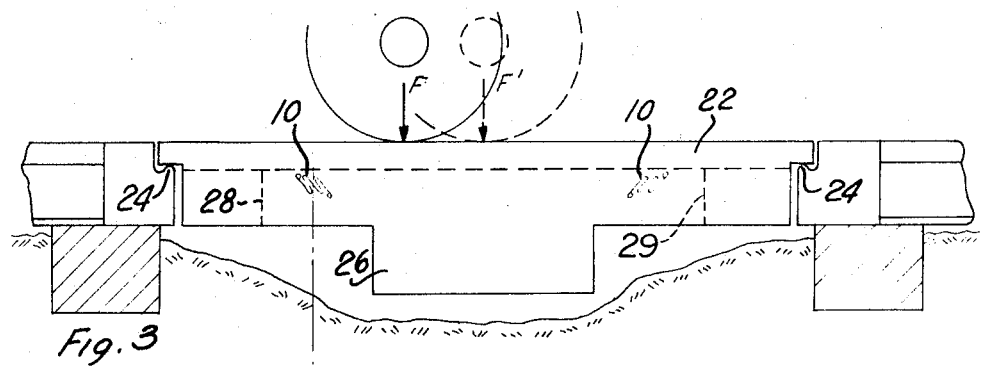
FIG. 3 is a side elevation view of a further modified form of the invention.
Figure 3A:
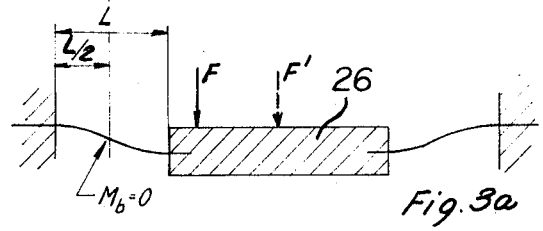
FIG. 3(a) is a schematic representation of the elastic deformation of the weigh rail of FIG. 3.

To eliminate this latter limitation, there is illustrated in FIG. 3 an arrangement which provides accurate weighing without requiring precise positioning of the vehicle wheels. This arrangement utilizes a weigh rail in which the mid-section is made essentially stiff or rigid and this mid-section forms a relatively large part of the effective length of the weighing section. With this arrangement, the deflection points are located midway between the end of the stiffened mid-section and the stiff connections at either end of the section. More particularly, as shown in FIG. 3, the weigh rail 22 is supported at either end at 24 with the mid-section 26 of the rail being substantially increased in dimension to provide a relatively rigid center portion. The reinforcing members 14 described in connection with the embodiment of FIG. 2 may be utilized to provide a weigh section which extends between the two lines 28, 29. With this arrangement, and referring to FIG. 3(a), it will be apparent that the inflection points of the weigh section are located at the midpoint between the ends of the rigid mid-section 26 and the points 28 and 29. The strain gages 10 are then positioned at these points of inflection as described above.

It will be noted that with this arrangement, the position of the wheel along the weigh section does not significantly alter the inflection points so long as the wheel is positioned somewhere over the reinforced or rigid mid-section 26.

Figure 4A:
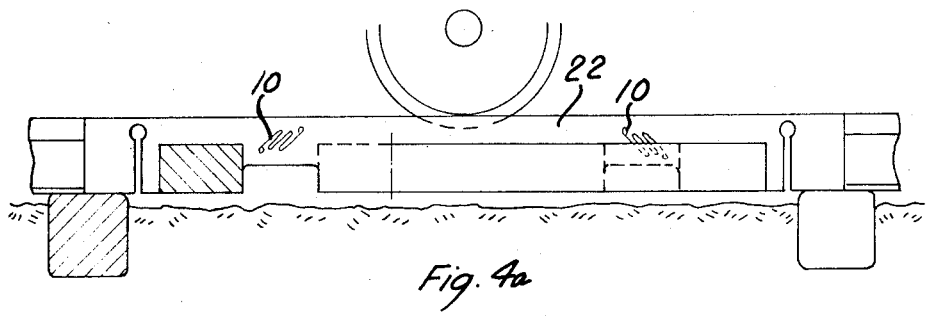
FIG. 4(a) is a side elevation view of a further modified form of the invention.
Figure 4B:
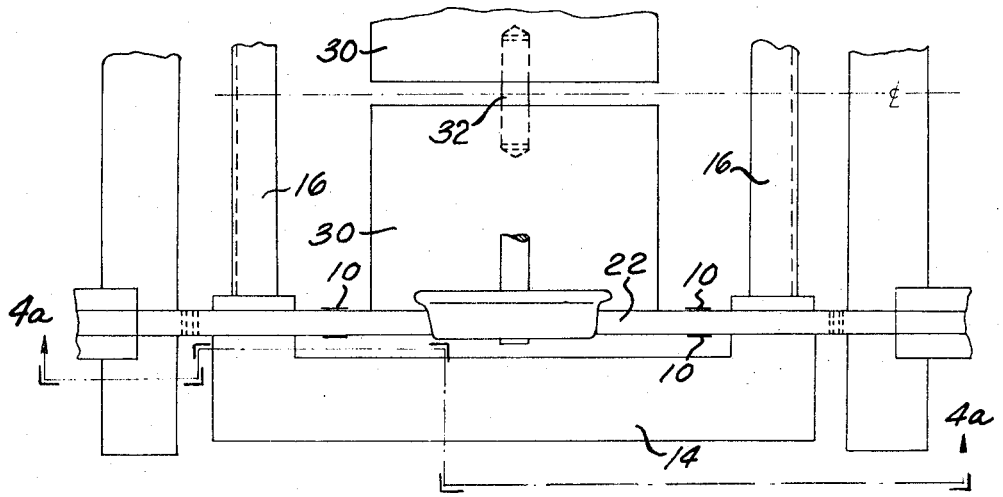
FIG. 4(b) is a plan view of the embodiment of FIG. 4(a).

FIGS. 4(a)-(c) illustrate a similar arrangement but in which the reinforcing member 14 is positioned on the outside of the rail 22 and in which, instead of a vertically extending stiffened section such as that shown at 26 in FIG. 3, a horizontally extending stiffening is provided at 30. With this arrangement, a very low profile design is obtained which can be utilized on existing tracks without any requirement for pits or foundations. Moreover, by interconnecting the two stiffening connections 30 by a rotatable pin 32, or by a fixed but torsionally weak connection, the stability of the system is improved while, at the same time, permitting the weighing device associated with one rail to twist relative to the weigh device at the other rail. The cross-members 16 also contribute to the stability of the system.

It is to be noted from FIG. 4(a) that the cross-sectional area of the measuring section where the strain gages are located has been adjusted. This technique may be used to give a suitable strain in the measuring section.

Figure 5:
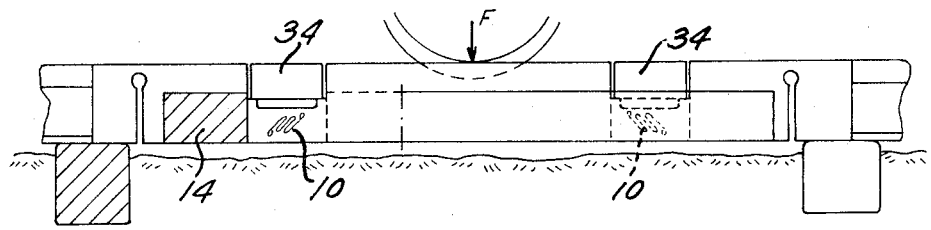
FIG. 5 illustrates a side elevation view of still a further modified form of the invention.
Figure 6:
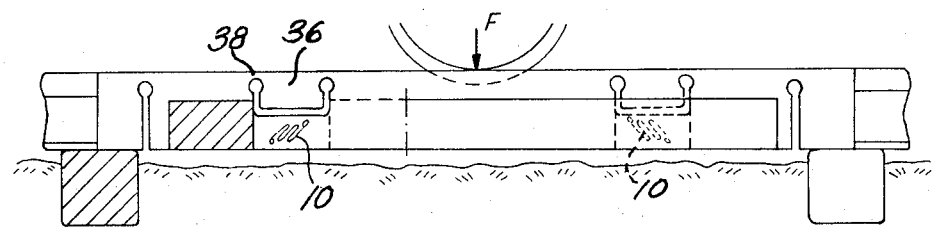
FIG. 6 is a side elevation view of another modified embodiment of the invention.

FIG. 5 illustrates a weighing device which provides protection against adverse effects on the system through imperfectly round wheels or the like. Thus, the system is essentially the same as that described in FIG. 4(a) but includes a transition rail 34 which is positioned directly over the strain gages in the measuring section. As an alternative, FIG. 6 illustrates a transition rail 36 which is formed as an integral part of the rail with the slotted construction shown at 38 providing essentially friction free deformable connections between the transition rail 36 and the rail section on either side thereof and therebetween arranged with bending stiff parts. With this latter construction, all the joints are eliminated and a smoother movement of the wheel across the weigh device is obtained.

Figure 7:
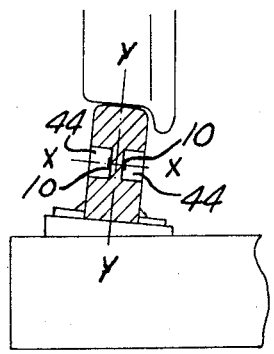
FIG. 7 is a cross-sectional view through the rail illustrating the manner in which the strain gages are secured to the rail.

Referring now to FIG. 7, the preferred manner in which the strain gages are positioned in the measuring section of the weigh rail is illustrated. As shown in that Figure, the measuring section has a generally I-shaped cross-section with the strain gages 10 being positioned in recesses 44 which are formed on the neutral axis X—X. This arrangement has the advantage that the strain gages are positioned close to the neutral axis Y—Y and on either side thereof with the result that the weigh device becomes essentially insensitive to horizontal forces acting transverse to the rails. Moreover, with the arrangement illustrated in FIG. 7, the level of strain imposed on the strain gages can be controlled by varying the height and the width of the web at these points.

Figure 8:
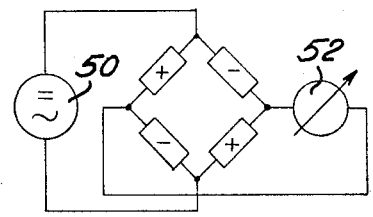
FIG. 8 is a schematic circuit showing a bridge connection with the strain gages.

FIG. 8 shows a typical bridge connection which may be utilized with the strain gages for obtaining a weight reading. As illustrated, the bridge circuit includes a generator 50 which applies current or voltage across one diagonal of the bridge. An output signal proportional to the load F is obtained over the other diagonal and indicated by means of a suitable indicating instrument 52.

From the foregoing, it will be appreciated that a weigh device has been provided which can be inserted in the normal rail system and which eliminates the need for any expensive foundation supports in order to achieve a high degree of weighing accuracy. Moreover, weigh devices constructed in accordance with the disclosed embodiments are substantially insensitive to the effects of variable external moments as well as the positioning of the load on the weigh section. This is achieved by a weigh rail which includes spaced rigid support sections between which a weigh section is defined with strain gages being located at measuring sections which correspond to the inflection points of the weigh section.

With this arrangement, dynamic weighing of an entire car can be readily achieved by positioning one weigh device at the location of each wheel or bogie and, by taking the readings from each weigh device as the car passes thereover, obtain an accurate reading of the weight of the entire car. Since the described weigh devices are capable of accommodating variations in the locations at which the load is applied, variations in axle spacings and car spacings will not have any significant effect on the accuracy of the weight readings.

All of the embodiments described contemplate a weigh device associated with both rails. It is, of course, possible to utilize only a single weigh device in one rail. However, such an arrangement results in reduced measuring accuracy because of the unknown load distribution in the vehicle.

While the invention has been described with reference to certain preferred embodiments, neither the embodiments illustrated not the terminology employed in describing them is intended to be limiting; rather, it is intended to be limited only by the scope of the appended claims.

Having thus described the invention, what is claimed is:

1. A weigh device for weighing vehicles adapted to be supported on and movable along a rail system, said weigh device comprising a weigh rail having a longitudinal neutral axis in the rail system adapted to cooperate with and support the wheel of a vehicle, support means cooperating with said weigh rail to provide spaced apart relatively rigid sections with a deflectable weigh section between said rigid sections, said deflectable weigh section having a bending moment curve when loaded by the wheel of a vehicle which includes inflection points at which the bending moments are zero, at least two strain sensing means secured to said weigh section and arranged to sense the shear in said weigh section, each of said strain sensing means being positioned on the longitudinal neutral axis of said weigh section and at an inflection point whereby said strain sensing means are effective to sense the shear in said weigh section independent of bending moments.

2. The weigh device of claim 1 wherein said weigh section includes stiffening means at the center portion thereof to prevent bending of said center portion under the load of a wheel.

3. The weigh device of claim 1 wherein said weigh section includes transition means in the wheel engaging surface with said strain sensing means and operative to minimize shock loading on said sensing means.

4. The weigh device of claim 1 wherein said weigh section has a generally I-shaped cross-section at the locations of said strain sensing means with said strain sensing means being secured to the web thereof.

5. The weigh device of claim 1 and further including connection means at either end of said weigh rail,
said connection means comprising a deflectable, joint connecting said weigh rail to the rail system.

6. The weigh device of claim 5 wherein each of said deflectable joints comprises a pair of spaced apart slots defining a stiff section therebetween with each of said slots forming a friction free joint.

7. The weigh device of claim 1 wherein said support means includes reinforcing means connected to said weigh rail.

8. The weigh device of claim 5 wherein said support means includes reinforcing means connected to said weigh rail,
said deflectable joints being outside of the rigid sections provided by said reinforcing means.

9. The weigh device of claim 1 and including means for maintaining the inflection points at known locations along the weigh section irrespective of variations in the forces present in the rail system.

10. The weigh device of claim 9 wherein said latter means includes deflectable joints between said rigid sections and the rail system.

11. The weigh device of claim 1 and including means for maintaining the inflection points at known locations along the weigh section irrespective of variations in the positioning of the load on the weigh section.

12. The weigh device of claim 11 wherein said latter means comprises stiffening means on said weigh section extending for a substantial distance on either side of the center of the weigh section to provide a stiffened center portion which resists bending when a load is applied thereto.

13. The weigh device of claim 12 wherein one of said strain sensing means is located midway between one of the rigid sections and the stiffened center portion and the other of said strain sensing means is located midway between the other of the rigid sections and the stiffened center portion.

14. A weigh device for weighing railway guided vehicles, said device comprising, a weigh rail having a longitudinal neutral axis adapted to be inserted in a rail system to form a continuous part of such system, said weigh rail including spaced apart stiffened sections defining a weigh section therebetween, said weigh section having a bending moment curve when loaded at a predetermined location which includes inflection points at which the bending moments are zero, at least two strain sensing means secured to said weigh section with said strain sensing means being arranged to sense the shear in said weigh section, each of said strain sensing means being positioned on the neutral axis of said weigh section and at an inflection point whereby said strain sensing means are operative to produce signals proportional to the shear in said weigh section.

15. The weigh device of claim 14 wherein said weigh section has a generally I-shaped cross-section at the location of said strain sensing means with said strain sensing means being secured to the web thereof.

16. The weigh device of claim 14 wherein said predetermined location is defined by a stiffened center portion of said weigh section and along which the load may be applied at various locations.

17. The weigh device of claim 16 and further including connection means at the ends of said weigh rail,
said connection means comprising a deflectable joint for connecting said weigh rail to the rail system.

18. A device for weighing of railway guided vehicles comprising at least one elongated rail section, substantially rigid connection means interconnecting spaced apart portions of said rail section whereby said interconnected portions are substantially fixedly restrained, said rail section including at least one flexible portion between said spaced apart portions, said flexible portion having a bending moment curve when loaded by the wheels of a vehicle which includes inflection points at which the bending moments are zero, and strain sensing means arranged on said flexible portion with the center line thereof substantially coinciding with the inflection points of the bending deflection curve of said flexible portions.

19. A device for weighing of railway guided vehicles comprising at least one elongated rail section having a vehicle supporting upper surface, at least two strain sensing means secured to said rail section such that they are influenced by substantially only shear stresses in the section with the sensing means being longitudinally spaced apart to define a measuring section therebetween and within which the load from at least one vehicle wheel can influence said sensing means, and friction free joint means at either end of said rail section, said friction free joint means comprising a pair of sapced apart slots formed in the undersurface of said rail sections whereby the rail section has a smooth continuous vehicle supporting upper surface.

* * * * *